US011931928B2

(12) United States Patent
McIntosh et al.

(10) Patent No.: US 11,931,928 B2
(45) Date of Patent: Mar. 19, 2024

(54) CONTINUOUS STRAND SUPERABSORBENT POLYMERIZATION

(71) Applicant: Evonik Corporation, Parsippany, NJ (US)

(72) Inventors: Stanley McIntosh, Kernersville, NC (US); Steffen Fischer, Krefeld (DE); Scott Smith, Düsseldorf (DE)

(73) Assignee: Evonik Superabsorber LLC, Greensboro, NC (US)

( * ) Notice: Subject to any disclaimer, the term of this patent is extended or adjusted under 35 U.S.C. 154(b) by 107 days.

(21) Appl. No.: 15/394,088

(22) Filed: Dec. 29, 2016

(65) Prior Publication Data
US 2018/0186042 A1    Jul. 5, 2018

(51) Int. Cl.
| | |
|---|---|
| *B29C 35/08* | (2006.01) |
| *B29C 48/00* | (2019.01) |
| *B29C 48/05* | (2019.01) |
| *C08F 2/10* | (2006.01) |
| *C08F 2/48* | (2006.01) |
| *C08F 220/06* | (2006.01) |
| *C08J 3/075* | (2006.01) |
| *B29K 33/00* | (2006.01) |
| *B29L 31/00* | (2006.01) |

(52) U.S. Cl.
CPC ...... *B29C 35/0805* (2013.01); *B29C 48/0022* (2019.02); *B29C 48/022* (2019.02); *B29C 48/05* (2019.02); *C08F 2/10* (2013.01); *C08F 2/48* (2013.01); *C08F 220/06* (2013.01); *C08J 3/075* (2013.01); *B29C 2035/0827* (2013.01); *B29C 2035/0833* (2013.01); *B29K 2033/08* (2013.01); *B29K 2033/12* (2013.01); *B29K 2995/0092* (2013.01); *B29L 2031/731* (2013.01); *C08J 2333/02* (2013.01)

(58) Field of Classification Search
CPC ................ B29C 47/0014; B29C 48/00; B29C 2035/0827
See application file for complete search history.

(56) References Cited

U.S. PATENT DOCUMENTS

| | | | | |
|---|---|---|---|---|
| 3,990,479 A | * | 11/1976 | Stine ................. | F16L 11/06 138/125 |
| 4,135,825 A | * | 1/1979 | Kertscher ............ | B29C 48/29 366/79 |
| 4,552,938 A | * | 11/1985 | Mikita .................. | C08F 220/06 524/547 |
| 4,857,610 A | * | 8/1989 | Chmelir ................ | B01J 19/22 526/88 |
| 4,985,518 A | * | 1/1991 | Alexander ............ | A61L 15/60 524/555 |
| 5,004,761 A | * | 4/1991 | Yada ................... | B29C 39/16 522/3 |
| 5,269,980 A | | 12/1993 | Levendis et al. | |
| 5,380,808 A | * | 1/1995 | Sumiya ................ | C08F 2/10 526/317.1 |
| 5,981,689 A | * | 11/1999 | Mitchell ............... | A61L 15/24 528/229 |
| 5,994,440 A | | 11/1999 | Staples et al. | |
| 6,090,875 A | | 7/2000 | Staples et al. | |
| 6,140,395 A | * | 10/2000 | Hatsuda ................ | B29B 7/186 523/319 |
| 6,174,978 B1 | * | 1/2001 | Hatsuda ............... | C08F 220/04 526/240 |
| 6,241,928 B1 | * | 6/2001 | Hatsuda ............... | B01J 13/0052 264/216 |
| 6,368,533 B1 | * | 4/2002 | Morman .............. | B29C 35/0261 264/211.18 |
| 6,667,372 B1 | * | 12/2003 | Miyake ................ | C08F 2/10 526/61 |
| 7,622,535 B2 | * | 11/2009 | Dairoku ............... | C08F 6/006 526/317.1 |
| 8,513,364 B2 | * | 8/2013 | Sasabe ................ | B01J 19/123 526/317.1 |
| 2001/0007064 A1 | * | 7/2001 | Mitchell ................ | A61L 15/60 604/368 |
| 2002/0007166 A1 | * | 1/2002 | Mitchell ................ | D21H 21/22 604/368 |

(Continued)

FOREIGN PATENT DOCUMENTS

| | | |
|---|---|---|
| CN | 1617694 A | 5/2005 |
| CN | 106232630 A | 12/2016 |

(Continued)

OTHER PUBLICATIONS

Buchholz, Frederick L. and Graham, Andrew T., "Modern Superabsorbent Polymer Technology," copyright 1998, John Wiley & Sons, Inc., Chapter 3: "Commercial Processes for the Manufacture of Superabsorbent Polymers," pp. 69-117 (51 pages).

*Primary Examiner* — Andrew D Graham
(74) *Attorney, Agent, or Firm* — Linda S. Li; Jason S. Ngui; Andrew H. Chung

(57) ABSTRACT

The present invention relates to a process to make continuous strand polymer comprising the following steps: a) providing a monomer mixture comprising water, a monomer, a crosslinker and an initiator; b) transporting the monomer mixture of step a) into a confining means wherein the monomer mixture is confined in said confining means; c) initiating polymerization of the monomer mixture in the confining means to make a continuous strand polymer; and d) emitting the continuous strand polymer from the confining means wherein the continuous strand polymer has a defined cross-sectional profile comprising an initial cross sectional diameter of at least 0.1 mm. The present invention is further directed to a process of making a continuous strand superabsorbent polymer.

17 Claims, No Drawings

(56) References Cited

U.S. PATENT DOCUMENTS

| | | | |
|---|---|---|---|
| 2002/0040095 A1* | 4/2002 | Dairoku | A61L 15/24 524/832 |
| 2003/0065296 A1* | 4/2003 | Kaiser | A61F 13/531 604/368 |
| 2004/0008323 A1 | 1/2004 | Williams | |
| 2004/0183235 A1* | 9/2004 | Dairoku | C08F 2/10 264/494 |
| 2008/0051494 A1* | 2/2008 | Savich | B29C 48/2552 524/47 |
| 2010/0119833 A1* | 5/2010 | Madsen | A61L 27/34 428/413 |
| 2010/0267914 A1* | 10/2010 | Westwood | B32B 5/02 526/348 |
| 2011/0309032 A1* | 12/2011 | Makl | B01D 19/0031 250/435 |
| 2012/0108695 A1 | 5/2012 | Won et al. | |
| 2012/0157634 A1* | 6/2012 | Lopez Villanueva | C08F 8/44 525/327.6 |
| 2012/0220745 A1 | 8/2012 | Machida et al. | |
| 2015/0093575 A1* | 4/2015 | Naumann | C08F 220/06 428/402 |
| 2015/0322180 A1 | 11/2015 | Matsumoto et al. | |
| 2016/0209113 A1* | 7/2016 | Leonhardt | B05D 3/061 |
| 2017/0276891 A1* | 9/2017 | Esseghir | G02B 6/448 |

FOREIGN PATENT DOCUMENTS

| | | |
|---|---|---|
| DE | 10314466 A1 | 10/2004 |
| DE | 10340253 A1 | 3/2005 |
| DE | 102004024437 A1 | 12/2005 |
| DE | 102005002412 A1 | 7/2006 |
| EP | 0348180 A2 | 12/1989 |
| EP | 1440984 A1 | 7/2004 |
| JP | S62195001 A | 8/1987 |
| JP | H0366703 A | 3/1991 |
| JP | H1018125 A | 1/1998 |
| JP | 2002-003509 A | 1/2002 |
| JP | 2004250689 A | 9/2004 |
| JP | 2015-507045 A | 3/2015 |
| JP | 2015506400 A | 3/2015 |
| KR | 20110105610 A | 9/2011 |
| TW | 201609892 A | 3/2016 |
| WO | 9640427 A1 | 12/1996 |
| WO | 2013104479 A1 | 7/2013 |
| WO | 2013104480 A1 | 7/2013 |
| WO | 2015163438 A1 | 10/2015 |
| WO | 2015163514 A1 | 10/2015 |

* cited by examiner

CONTINUOUS STRAND SUPERABSORBENT POLYMERIZATION

FIELD OF THE INVENTION

The present invention relates to a process of making continuous strand superabsorbent polymer, and continuously polymerizing a monomer mixture into a controlled shape and particulate superabsorbent polymer made from the continuous strand superabsorbent polymer. In addition, the present invention relates to the process of continuously producing superabsorbent polymer in such a manner as to allow for controlled-shape strands, or discrete particles. This invention is also directed to improving the process of making superabsorbent polymers including reducing steps of the process of making particulate superabsorbent polymer, and an improved superabsorbent polymer.

BACKGROUND OF THE INVENTION

The present invention relates to polymers, a process to make polymers, superabsorbent polymers and a process to make superabsorbent polymers. A superabsorbent polymer, in general refers to a water-swellable, water-insoluble polymer, or material, capable of absorbing at least about 10 times its weight, and up to about 30 times or more its weight in an aqueous solution containing 0.9 weight percent sodium chloride. Examples of superabsorbent polymer may include a crosslinked partially neutralized acrylate polymer, and the formation of superabsorbent hydrogel from the polymerization, and formation of particulate superabsorbent polymer compositions capable of retaining the aqueous liquids under a certain pressure in accordance with the general definition of superabsorbent polymer. Superabsorbent polymer particles, or particulate superabsorbent polymer, are used to produce diapers, tampons, sanitary napkins and other hygiene articles, as well as also water-retaining agents in agricultural, cable, sealing, fire-fighting, packaging, medical and other applications benefiting from aqueous absorption.

The preparation of superabsorbent polymer and particulate superabsorbent polymer is described in the monograph "Modern Superabsorbent Polymer Technology", F. L. Buchholz and A. T. Graham, Wiley-VCH, 1998, pages 71 to 103. Superabsorbent polymers are generally made from the polymerization of a monomer mixture of acrylic acid blended with a neutralization agent in the presence of an initiator to form a poly-acrylic acid sodium salt (sometimes referred to as sodium polyacrylate). Superabsorbent polymers may be made using one of several polymerization methods: gel polymerization, suspension polymerization, solution polymerization, or spray polymerization. Each of the processes has their respective advantages but all yield a consistent quality of product.

In gel polymerization, a monomer mixture of acrylic acid, neutralizing agent, water, cross-linking agents, and UV initiator chemicals are blended and placed into a "reactor", which may be a continuous belt, trays, a kneader or the like. For example, with a continuous belt, the monomer mixture is contained on the continuous belt in a long chamber, wherein polymerization is initiated. The process results in a continuous "slab" of superabsorbent polymer, generally called a polymer hydrogel, on the belt, wherein the slab has general dimensions of thickness from about 25 mm to about 300 mm and a width of from about 800 mm to about 1500 mm for production purposes. Polymerization of the polymer for lab purposes is generally, for example done in a plastic tray or a bucket, and a thickness of about 50 to about 100 mm.

The resulting continuous slab of superabsorbent polymer hydrogel may be chopped and extruded with a commercial extruder, followed by drying in a forced air oven to make a final product moisture level of less than 10 wt %. The dried superabsorbent polymer may then be coarse-ground in a crusher, milled in a three-stage roller mill and sieved to remove particles greater than 850 µm and smaller than 150 µm, to form what is generally referred to as particulate superabsorbent polymer. The particulate superabsorbent polymer may then be surface-treated with surface crosslinking, and other surface treatment agents, and post treated after surface crosslinking, and finally sieved again to form a surface treated particulate superabsorbent polymer.

KR20110105610 discloses to a method of producing a superabsorbent resin by supplying a monomer composition containing a water-soluble ethylenically unsaturated monomer, a photopolymerization initiator, and a solvent. The monomer composition is dropped into a shape forming unit to form a predetermined form of the superabsorbent polymer, such as a slit or a hole. The falling monomer is then polymerized by irradiation. Positioned below the light irradiation section of the forming unit is a crusher for converter the superabsorbent polymer into porous particles having a size of 0.5 to 20 mm. This process is disadvantaged as the monomer is polymerized while falling uncontained. For example, if the shape is provided by pushing the monomer through a hole, as the superabsorbent polymer emerges, surface tension takes over and the shape can be lost. For example, if monomer is pushed through a star-shaped nozzle, it will return to a round shape after emerging. Usually, the monomer must be thickened by the addition of chemical thickeners to keep if from falling too quickly, or to try to help it retain its shape, also a disadvantage.

US 2004/0183235 discloses a method of manufacturing a superabsorbent polymer shaped body that is produced easily without using a thickening agent. Light is radiated onto an aqueous solution including a photo polymerization initiator and a water-soluble ethylenically unsaturated monomer. When a viscosity of 10 mPa·s or more is attained, radiation of the light is stopped temporarily. Then, the aqueous solution, which is thickened by the initial polymerization, is shaped into a desired shape is not particularly limited, as long as it has a certain shape. Polymerization is then restarted after shaping when the monomer is unconfined. The claimed advantage of this process is that separate thickeners are not added, but rather the monomer is thickened by partial polymerization. However, the same disadvantages apply and thickening is still required. In any case, the shaping is a separate step from the polymerization step and the shape can be lost or only partially retained.

Superabsorbent polymer can be made into a fiber form wherein a monomer mixture of acrylic acid, methyl acrylate and sodium hydroxide are polymerized in water to form a polymer solution, which is not a SAP because it lacks crosslinking. The superabsorbent polymer is then extruded to produce a cylindrical fiber of precise definition of about 2-20 decitex, or about 2-18 denier, or about 0.001 to 0.008 mm. In order to be extruded, the polymer must be low molecular weight and not crosslinked, and the solution must be relatively low solids, both significant disadvantages. In order to become a superabsorbent polymer, the fibers must then be subjected to a separate crosslinking step after the extrusion. A fiber, a single filament of material such as nylon, polyester or superabsorbent polymer, is measured in terms of linear mass density, the weight of a given length of fiber. Various units are used to refer to the measurement of a fiber, such as the denier (grams per 9,000 m) and decitex (grams per 10,000 m). The superabsorbent polymer fiber is then thermally treated and possibly treated in other manners, but not made into particles due to the size of the cylindrical fiber. Because a low solids solution is extruded, an energy intensive drying step is required. The entire known process is complicated, involves separate polymerization and cross-linking steps, and is generally significantly more expensive than gel polymerizations in a continuous belt reactor or kneader reactor.

The production of particulate superabsorbent polymer by spray polymerization or polymerizing droplets of a monomer solution is described, for example, in EP 348 180 A1, WO 96/40427 A1, U.S. Pat. No. 5,269,980, DE 103 14 466 A1, DE 103 40 253 A1, DE 10 2004 024 437 A1 and DE 10 2005 002 412 A1, and also the prior German application 102006001596.7. Spray polymerization allows the process steps of polymerization and drying to be combined. In addition, the particle size can be set within certain limits by virtue of suitable process control.

In particular, processes to make particulate superabsorbent polymer may include 9 steps including the following steps: 1) preparing a monomer mixture; 2) polymerizing the monomer mixture to form a superabsorbent polymer hydrogel having a moisture content of 40 to 80%; 3) chopping the superabsorbent polymer hydrogel; 4) drying the superabsorbent polymer hydrogel to have a water content of less than 10%; 5) milling the superabsorbent polymer hydrogel; 6) sieving the milled superabsorbent polymer hydrogel resulting in a particulate superabsorbent polymer having a particle size distribution of from 150 μm to 850 μm; 7) surface crosslinking the particulate superabsorbent polymer; 8) optionally, further including surface treatment of surface crosslinked superabsorbent particulate polymer; and 9) final sieving of the particulate superabsorbent polymer.

Commercial particulate superabsorbent polymer are widely used in a variety of personal care products, such as infant diapers, child training pants, adult incontinence products, feminine care products, and the like. In general, these particulate superabsorbent polymer compositions have a centrifuge retention capacity (CRC) of at least 25 grams of 0.9 weight percent sodium chloride aqueous solution per gram of the polymer.

Since the general gel polymerization processes to make superabsorbent polymer includes various methods to make bulk type superabsorbent polymer, there is a need, or desire, for a process to make a continuous strand superabsorbent polymer having a cross sectional diameter of from 0.1 mm to 10 mm and particulate superabsorbent polymer formed from the continuous strand polymer in a simplified process where the strand shape is formed during polymerization and not by extrusion, and polymerization and internal crosslinking can be performed in a single step.

SUMMARY OF THE INVENTION

The present invention is directed to a process to make continuous strand superabsorbent polymer comprising the following steps: a) providing a monomer mixture comprising water, a polymerizable unsaturated acid group containing monomer, a crosslinker and an initiator; b) transporting the monomer mixture of step a) into a confining means wherein the monomer mixture is cross-sectionally confined in said confining means; c) initiating polymerization of the monomer mixture in the confining means; and d) emitting a continuous strand superabsorbent polymer from the confining means wherein the continuous strand superabsorbent polymer has a defined cross-sectional profile comprising an initial cross sectional diameter of from 0.1 mm to 10 mm.

In addition, the present invention relates to a process to make continuous strand polymer comprising the following steps: a) providing a monomer mixture comprising water, a monomer, a crosslinker and an initiator; b) transporting the monomer mixture of step a) into a confining means wherein the monomer mixture is cross-sectionally confined in said confining means; c) initiating polymerization of the monomer mixture to make a continuous strand polymer; and d) emitting the continuous strand polymer from the confining means wherein the continuous strand polymer has a defined cross-sectional profile comprising an initial cross sectional diameter of at least 0.1 mm, immediately prior to exiting the confining means.

With the foregoing in mind, it is a feature and advantage of the invention to provide a process of making a continuous strand polymer. Numerous other features and advantages of the present invention will appear in the following description.

Definitions

Within the context of this specification, each term or phrase below will include the following meaning or meanings.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. The term "about" includes the given quantity of the ingredient or property as stated. Whether or not modified by the term "about," the claims include equivalents to the quantities.

The term "Centrifuge Retention Capacity (CRC)" as used herein refers to the ability of the particulate superabsorbent polymer to retain liquid therein after being saturated and subjected to centrifugation as set forth in the Test Procedures disclosed herein. The resultant retention capacity is stated as grams of liquid retained per gram weight of the sample (g/g).

The terms "crosslinked", "crosslink", "crosslinker", or "crosslinking" as used herein refers to any means of linking polymer chains together. Such a crosslinking means can include, for example, physical entanglement, crystalline domains, covalent bonds, ionic complexes and associations, hydrophilic associations such as hydrogen bonding, hydrophobic associations, or Van der Waals forces. Crosslinking, when applied to water soluble polymers generally renders them water-insoluble but water-swellable.

"Cross-sectionally confined in a confining means" refers to a continuous tube or trough that is capable of confining a monomer in at least one axis direction perpendicular to the monomer flow as the monomer moves through the confining means, causing the monomer to polymerize into a continuous strand having a cross-sectional diameter of 0.1 mm to 10 mm.

The term "cross-sectional profile" as used herein refers to the cross-sectional profile of the inside of the confining means, such as a tube, or found in a channel or groove, or it could be a profile defined through appropriate deposition into a trough in a moving surface, for example.

The term "cross-sectional diameter" as used herein refers to the longest extension of the cross-sectional profile to be measured perpendicular to the long axis of the strand. In the case of a non-circular cross-section, the cross-sectional diameter is the diameter of the smallest circle that encompasses the entire cross-sectional shape of the strand.

The term "circular cross section" refers to a cross section of a strand taken perpendicular to the long axis of the strand where the cross section forms a circle. A circle is a simple planar closed shape where the exterior boundary is located at a given distance from a given point, the center, where the distance from the center does not vary by more than 20%; equivalently, it is the curve traced out one a plane by a point that moves so that its distance from a given point does not vary by more than 20%.

The term "internal crosslinker" or "monomer crosslinker" as used herein refers to use of a crosslinker in the monomer solution to form the polymer gel structure.

The term "dry superabsorbent polymer" as used herein generally refers to the superabsorbent polymer or continuous strand superabsorbent polymer having less than about 20% moisture.

The terms "particle," "particulate," and the like, when used with the term "superabsorbent polymer," refer to the form of discrete units.

The terms "particulate superabsorbent polymer" and "particulate superabsorbent polymer composition" refer to the form of superabsorbent polymer and superabsorbent polymer compositions in discrete form, having less than 20 weight-% water, wherein the "particulate superabsorbent polymer" and "particulate superabsorbent polymer compositions" may have a particle size of less than 1000 µm, or from about 150 µm to about 850 µm, or with greater than 85% of the particles between 150 µm and 600 µm.

The term "polyacrylic acid (salt)-based superabsorbent polymer" as used herein refers to a crosslinked superabsorbent polymer that arbitrarily may contain a graft component and also contains, as a main component, acrylic acid and/or salt thereof (hereinafter, referred to as "acrylic acid (salt)") as a repeating unit. Specifically, "polyacrylic acid (salt)-based water absorbent resin" indicates a polymer that contains preferably 30 mol % to 100 mol % of acrylic acid (salt) as a monomer except for a crosslinking agent(s).

The term "polymer" includes, but is not limited to, homopolymers, copolymers, for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries.

The acronym "PSD" as used herein is an abbreviation for Particle Size Distribution, and referring to the mass distribution of particles remaining on specified sieves as measured through sieve classification according to the standard EDANA test method NWSP 220.0.R2 (15).

The term "superabsorbent polymer" as used herein refers to water-swellable, water-insoluble organic or inorganic materials including superabsorbent polymers and superabsorbent polymer compositions capable, under the most favorable conditions, of absorbing at least about 10 times their weight, or at least about 15 times their weight, or at least about 25 times their weight in an aqueous solution containing 0.9 weight percent sodium chloride.

The term "surface crosslinking" as used herein refers to the level of functional crosslinks in the vicinity of the surface of the superabsorbent polymer particle, which is generally higher than the level of functional crosslinks in the interior of the superabsorbent polymer particle. As used herein, "surface" describes the outer-facing boundaries of the particle.

The term "weight % solids" of the monomer solution refers to the weight of the sum of all the monomers and other components with the exception of water expressed as a percentage of the weight of the total monomer mixture of a given recipe including the water. Likewise, the solid content of the hydrogel is the percentage of non-water content of the hydrogel as a percent of the weight of the hydrogel including the water content.

The term "% by weight" or "% wt" as used herein and referring to components of the dry particulate superabsorbent polymer composition, is to be interpreted as based on the weight of the dry superabsorbent polymer composition, unless otherwise specified herein.

As used herein, a range "X to Y" means "X or more (higher) and Y or less (lower)". Moreover, "weight" is synonymous with "mass", "wt %" is synonymous with "mass %", and "parts by weight" is synonymous with "parts by mass". Moreover, unless otherwise noted, "ppm" means "ppm by weight" or "ppm by mass".

DETAILED DESCRIPTION OF THE INVENTION

While typical aspects of embodiment and/or embodiments have been set forth for the purpose of illustration, this Detailed Description of the Invention should not be deemed to be a limitation on the scope of the invention. Accordingly, various modifications, adaptations, and alternatives may occur to one skilled in the art without departing from the spirit and scope of the present invention. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

In accordance with the invention, a process to make polymer and superabsorbent polymer can be achieved using the methods described herein. The process to make polymer and superabsorbent polymer of the present invention eliminates numerous steps of the process to make particulate superabsorbent polymer and produces a more uniform product.

The present invention is directed to a process to make continuous strand superabsorbent polymer comprising the following steps: a) providing a monomer mixture comprising water, a polymerizable unsaturated acid group containing monomer, a crosslinker and an initiator; b) transporting the monomer mixture of step a) into a confining means wherein the monomer mixture is cross-sectionally confined in said confining means; c) initiating polymerization of the monomer mixture in the confining means; and d) emitting a continuous strand superabsorbent polymer from the confining means wherein the continuous strand superabsorbent polymer has a defined cross-sectional profile comprising an initial cross sectional diameter of at least 0.1 mm, or from 0.1 mm to 10 mm immediately prior to exiting the confining means. It is essential that the shape of the polymer strand or particle is determined by the shape of the confining means and not by a later, separate extrusion or forming step.

Hence, the cross sectional shape of the strand is given while polymerizing within the confining means. In the simplest embodiment, the cross sectional shape of the confining means is ideally circular. In this case, the strand becomes cylindrical while polymerizing. The diameter of the confining means is identical to the cross sectional diameter of the strand immediately prior to exiting the confining means and is retained when immediately exiting the confining means.

A suitable superabsorbent polymer may be selected from polymers that are synthetic, natural, biodegradable, modified natural, or any combination thereof.

A superabsorbent polymer, which is used as a main component in the particulate water absorbing agent that is obtained by the producing method of the present invention, is in general a polyacrylic acid (salt)-based superabsorbent polymer, and is a water-swelling and water-insoluble crosslinked polymer. This water-swelling and water-insoluble crosslinked polymer contains an acrylic acid (salt) as a polymerizable unsaturated acid group containing monomer in a repeating unit (except for crosslinking agent later described), in an amount of from 30 mol % to 100 mol %, or from 50 mol % to 100 mol %, or from 70 mol % to 100 mol %, or from 90 mol % to 100 mol %, or substantially 100 mol %.

One or more acid groups of a monomer are generally neutralized before or after polymerization, forming a neutralized salt. A neutralized salt may be a salt of an alkali metal or an ammonium salt, potentially with some di-, tri-, or polyvalent cations added to impart specific properties such as, for example, absorption speed. Sodium is the most common neutralization cation, and preferable neutralization degrees are 20 mol % to 100 mol %, or 50 mol % to 99 mol %, or 60 mol % to 90 mol %, or from 50 mol % to 80 mol % of the acid group be neutralized. The neutralization can be carried out before polymerization, or can be carried out on a hydrogel after polymerization, or both the neutralizations can be carried out. Generally, the neutralization is carried out before polymerization by adding a neutralization agent to the monomer mixture.

Monomer Mixture

The process to make continuous strand superabsorbent polymer of the present invention includes an initial step a) of providing a monomer mixture comprising water, a monomer, crosslinker and an initiator. For a superabsorbent polymer, as set forth in embodiments of the present invention, the monomer mixture will include from about 20 wt % to about 99.9 wt % of the monomer mixture of a polymerizable unsaturated acid group containing monomer. A suitable monomer, or monomer combination, may include ethylenically unsaturated compounds where free-radical initiation and propagation will yield a polymer suitable for processing and application as a superabsorbent polymer. Monomers with anionic functionalities, such as carboxylic or sulfonic acid groups are suitable, and those monomers may also have alkyl, amido, or other such side groups. Monomers with no acidic functionality may also be included, though it is desirable that at 50-75% of the monomer groups in the polymer backbone have acid group functionalities, and it is particularly desirable that those acid groups be carboxyl groups.

A suitable polymerizable unsaturated acid group containing monomer includes any of those containing acid groups, such as acrylic acid or methacrylic acid; or 2-acrylamido-2-methylpropanesulfonic acid, or mixtures thereof. It is desirable for at least about 50 wt %, and more desirable for at least about 75 wt % of the acid groups to be carboxyl groups. A suitable polymerizable monomer includes any of those containing carboxyl groups, such as acrylic acid, methacrylic acid, or 2-acrylamido-2-methylpropanesulfonic acid, or mixtures thereof. It is desirable for at least about 50 wt %, and more desirable for at least about 75 wt % of the acid groups to be carboxyl groups.

The monomer mixture may further include a neutralization agent in order to neutralize the acid groups of the polymerizable unsaturated acid group containing monomer are neutralized to the extent of from 20 mol % to 100 mol %, or from 50 mol % to 99 mol %, or 60 mol % to 90 mol %, or from 50 mol % to 80 mol % of the acid group be neutralized. The neutralization agent may include an alkali base material including sodium, potassium or ammonium salts resulting in the acid groups being present as the corresponding salts. The alkali base may be the hydroxide, carbonate, or bicarbonate salt of sodium, potassium, or ammonia. It is noted that the neutralization may be achieved by either adding the alkali base to the monomer solution or adding the monomer such as acrylic acid to the alkali base.

According to one method, the polymerizable acidic monomer is partially neutralized by either adding the neutralization agent, such as sodium hydroxide, to the monomer or by adding the polymerizable acidic monomer to a neutralization agent. Then the partially neutralized monomer, such as acrylic acid, is converted into a gel by polymerization in the presence of crosslinking agents and any further components, and the gel is formed into particulate superabsorbent polymer by additional process steps including cutting and drying.

The monomer mixture of the invention also includes from about 0.001 wt % to about 5 wt % by weight or from about 0.2 wt % to about 3 wt % based on the total amount of the polymerizable unsaturated group containing monomers of at least one internal cross linking agent. The internal crosslinking agent generally has at least two ethylenically unsaturated double bonds or one ethylenically unsaturated double bond and one functional group which is reactive towards acid groups of the polymerizable unsaturated acid group containing monomers or several functional groups which are reactive towards acid groups can be used as the internal crosslinking component and which is present during the polymerization of the polymerizable unsaturated acid group containing monomers.

Examples of internal crosslinking agents used in superabsorbent polymers include aliphatic unsaturated amides, such as methylenebisacryl- or -methacrylamide or ethylenebisacrylamide, and furthermore aliphatic esters of polyols or alkoxylated polyols with ethylenically unsaturated acids, such as di(meth)acrylates or tri(meth)acrylates of butanediol or ethylene glycol, polyglycols or trimethylolpropane, di- and triacrylate esters of trimethylolpropane which is preferably oxyalkylated, preferably ethoxylated, with 1 to 30 mol of alkylene oxide, acrylate and methacrylate esters of glycerol and pentaerythritol and of glycerol and pentaerythritol oxyethylated with preferably 1 to 30 mol of ethylene oxide and furthermore allyl compounds, such as allyl (meth)acrylate, alkoxylated allyl (meth)acrylate reacted with preferably 1 to 30 mol of ethylene oxide, triallyl cyanurate, triallyl isocyanurate, maleic acid diallyl ester, poly-allyl esters, vinyl trimethoxysilane, vinyl triethoxysilane, polysiloxane comprising at least two vinyl groups, tetraallyloxyethane, tetraallyloxyethane, triallylamine, tetraallylethylenediamine, diols, polyols, hydroxy allyl or acrylate compounds and allyl esters of phosphoric acid or phosphorous acid, and furthermore monomers which are capable of crosslinking, such as N-methylol compounds of unsaturated amides, such as of methacrylamide or acrylamide, and the ethers derived there from. Ionic crosslinkers such as aluminum metal salts may also be employed. Mixtures of the crosslinking agents mentioned can also be employed.

In another embodiment, the superabsorbent polymer may include from about 0.001 wt % to about 0.1 wt % based on the total amount of the polymerizable unsaturated group containing monomer of a second internal crosslinker which may comprise compositions comprising at least two ethylenically unsaturated double-bonds, for example, methylenebisacrylamide, methacrylamide or ethylenebisacrylamide; additionally, esters of unsaturated mono- or polycarboxylic acids of polyols, such as, diacrylates or triacrylates, e.g., butanediol- or ethylene glycol diacrylate or -methacrylate; trimethylolpropane triacrylate, as well as their alkoxylated derivatives; additionally, allyl compounds, such as allyl (meth)acrylate, triallyl cyanurate, maleic acid diallyl ester, polyallyl ester, tetraallyloxyethane, di- and triallylamine, tetrallylethylenediamine, allyl esters of phosphoric acid or phosphorous acid. Moreover, compounds having at least one functional group reactive towards acid groups may also be used. Examples thereof include N-methylol compounds of amides, such as methacrylamide or acrylamide, and the ethers derived there from, as well as di- and polyglycidyl compounds.

The monomer mixture further includes an initiator. The usual initiators, such as e.g., azo or peroxo compounds, thermal initiator systems or UV initiators, (sensitizers), and/or radiation, and others well-known in the art, are used for initiation of the free-radical polymerization. The use of ionizing radiation is also possible.

The monomer mixture may include a polymerization initiator, which is selected as appropriate in accordance with a form of polymerization, and is not limited to a particular one. Examples of the polymerization initiator encompass a photolytic polymerization initiator, a pyrolytic polymerization initiator, and a redox polymerization initiator. A used amount of the polymerization initiator is from 0.0001 mol % to 1 mol %, from 0.001 mol % to 0.5 mol %, relative to the moles of total monomer.

Examples of the photolytic polymerization initiator encompass a benzoin derivative, a benzyl derivative, an acetophenone derivative, a benzophenone derivative, an azo compound, and the like.

Examples of the pyrolytic polymerization initiator encompass persulfates such as sodium persulfate, potassium persulfate, and ammonium persulfate; peroxides such as hydrogen peroxide, t-butyl peroxide, and methyl ethyl ketone peroxide; azo compounds such as an azonitrile compound, an azoamidine compound, a cyclic azoamidine compound, an azoamide compound, an alkylazo compound, 2,2'-azobis(2-amidinopropane)dihydrochloride, and 2,2'-azobis[2-(2-imidazoline-2-yl)propane]dihydrochloride; and the like.

Alternatively, the photolytic polymerization initiator(s) can be used in combination with 1 polymerization initiator(s) that decompose by other mechanisms.

In some aspects, the monomer mixture may further include a second suitable polymerizable unsaturated acid group containing monomer that can be copolymerized with the ethylenically unsaturated monomer may include, but is not limited to acrylamide, methacrylamide, hydroxyethyl acrylate, dimethylaminoalkyl (meth)-acrylate, ethoxylated (meth)-acrylates, dimethylaminopropylacrylamide, or acrylamidopropyltrimethylammonium chloride. Such monomer may be present in a range of from 0 wt % to about 40 wt % of the copolymerized monomer.

According to the present invention, the monomer mixture may further include, if needed, preferably 5 weight % or lower, and more preferably 1 weight % or lower of a foaming agent, a surfactant, a blowing agent, plasticizer, a deodorant agent, an antibacterial agent, a plasticizer, a perfume, a pigment, a dye, a hydrophilic short fiber, inorganic powder such as silicon dioxide or titanium oxide, a thermoplastic resin such as polyethylene or polypropylene, a chain transfer agent such as hypophosphorous acid (salt), or the like. Furthermore, the monomer mixture may include up to about 20 wt % superabsorbent polymer fines having a particle size of about 150 µm or less.

After preparation, the monomer mixture may be cooled to a temperature of from about 0° C. to 20° C., or from 3° C. to 10° C. Nitrogen may be bubbled through the monomer mixture for about 5 minutes. The monomer mixture may also be processed at ambient or elevated temperature without nitrogen sparging.

The monomer may be characterized by several parameters such as solids and viscosity. The monomer mixture may have solids content of from about 25% to about 50%, or from about 30% to about 40% solids. The monomer mixture may have a viscosity of from about 5 centipoise to about 200,000 centipoise, or from 7 centipoise to about 50,000 centipoise, or about 10 centipoise to about 10,000 centipoise or less than 10 centipoise. All viscosity values are measured at a temperature of 25° C. according to ISTM D2196-05 Method A with a Brookfield Dial-Reading analog viscometer Model LV at 60 rpm using a Number 1 spindle for viscosity range 1 to 100 cP, a Number 2 spindle for 50 to 500 cP, a Number 3 spindle for 400 to 2,000 cP or a Number 4 spindle for 1,000 to 10,000 cP, selected so that the dial reading falls between 20 and 80. The monomer mixture is then transported to the next step of the process, step b), into a confining means wherein the monomer mixture is cross-sectionally confined.

Transporting Monomer Mixture

The process to make continuous strand superabsorbent polymer of the present invention includes another step b) of transporting the monomer mixture of step a) into a confining means wherein the monomer mixture is cross-sectionally confined in said confining means. The monomer mixture solution may be pumped into a confining means such as silicone elastomeric tubing, with a pump such as a Cole-Parmer Masterflex pump including a pump head and pump high pressure tubing extending from the pump. A coupling, such as barbed coupling may be used to connect the outlet of the pump high pressure tubing to the inlet of the confining means. The monomer mixture may be pumped into the confining means at a rate of at least 0.1 gal/min, or at least 1 gal/min, or from 0.1 gal/min to 100 gal/min, or from 1 gal/min to 10 gal/min. The ratio of pumps to individual strands may range from one strand per pump to multiple strands per pump, including from 1 to 10,000 strands per pump, or from 1 to 1000 strands per pump, or from 1 to 100 strands per pump, or from 1 to 50 strands per pump or from 1 to 30 strands per pump.

The confining means may include a tube, or tubing, having a certain diameter and length, and transparent to allow radiation pass through the tube, or tubing, to the monomer mixture. The tube or tubing may comprise a polymeric material such as an elastomeric material. Using an elastic material is preferred since during polymerizing the mixture may swell. The tube or tubing may comprise silicone, or elastomeric silicone material. The cross-sectional diameter of the confining means may be from 0.1 mm to 10 mm, or from 0.1 mm to 5 mm, or from 0.1 mm to 1 mm. The cross-sectional diameter of the confining means is therefore quite close to the later particle size of the superabsorbent particle. Hence, the grinding process is not as extensive compared with conventional production. When the confining means is a tube, the tube may have a length of greater than 1 cm, or from 2 cm to 100 cm, or from 5 cm to 25 cm, or from 5 cm to 15 cm. The ratio of extension of the confining means in one direction perpendicular to the axis to the extension of the confining means in another direction perpendicular to the axis may not more than 10:1. Probably, said ratio may be 5:1. In case of circular confining means, the ratio is ideally 1:1, but may vary from the ideal by up to 20%.

In one preferred embodiment, the confining means has a circular cross-section. The inner diameter of the confining means having a circular cross-section ranges from 0.1 to 10 mm, preferably from 0.1 mm to 1 mm. As the individual production capacity of such thin confining means is quite low, industrial production scale is accomplished by a "numbering up," i.e., providing a great many of confining means each having a small cross-section.

The confining means may be either inelastic or elastic. Elastic material is preferred. In addition, the confining means may be transparent radiation with a wavelength between 300 nm and 500 nm. As set forth in one embodiment, the monomer mixture may be pumped at 1 g/min with a Cole-Parmer Masterflex pump, through a pump "high pressure" tubing into a 10 cm length of silicone elastomer tubing having an inner diameter of 1.56 mm.

In another embodiment, the monomer mixture solution may be transported into a confining means such as a textured belt or a moving textured belt. The belt may be textured in such a way as to generate strands in continuous grooves, or the belt might have ridges or protrusions so as to generate an interwoven or connected network of strands. The monomer mixture solution may be transported into a trough or groove of a belt, by directly placing the monomer mixture into the trough or groove of the belt. The monomer mixture may be transported into the trough or groove in a moving belt at a rate of at least 0.1 gal/min, or at least 1 gal/min, or from 0.1 gal/min to 100 gal/min, or from 1 gal/min to 10 gal/min. The belt may include from 1 to 100000 strands per belt, or from 1 to 1000 strands per belt, or from 1 to 500 strands per belt or from 1 to 50 strands per belt. This number of strands is intended for achieving production in industrial scale.

The long narrow channel, gaps between protrusions, or depression in a belt may have a certain cross-sectional diameter, and preferably allows radiation of the monomer mixture. The cross-sectional diameter of the trough, gaps between protrusions or groove may be from 0.1 m to 10 mm, or from 0.1 mm to 5 mm, or from 0.1 mm to 1 mm.

Polymerization

The process to make continuous strand superabsorbent polymer of the present invention includes another step c), initiating polymerization of the monomer mixture in the confining means to initiate polymerization of the monomer mixture. It is noted that the monomer mixture is polymerized while within a confining means so that the defined shape is permanently fixed through polymerization into a three dimensional crosslinked polymer network and not by a molding or extrusion process shaping an already crosslinked polymer. In particular, it is preferred that the monomer has not been polymerized prior to step c) in the confining means; that is, the monomer mixture has not been exposed to irradiation to initiate polymerization prior to step c).

As the mixture polymerizes within the confining means it may swell slightly. Hence, it is preferred to use a confining means made of an elastic material. The swelling usually subsides before the strand exits the tube. This is another important difference to conventional extrusion processes using stiff extruding orifices for shaping an already polymerized material.

The confining means, such as tubing, may be positioned so that the barbed coupling is very near a photoreactor equipped with wavelength tubes, with a maximum light intensity at a wavelength of from 300 nm to 500 nm. The photoreactor may be a Rayonet RPR-200. The wavelength tubes may be 16 BLB long wavelength tubes available from Green Energy Lighting Corporation, with a maximum light intensity at about 370 nm.

In one embodiment, polymerization begins in the silicone tube to the extent that a shape-defined continuous strand emerges from the tube. Gravity then pulls the strand down to a collection means as the strand continuously emerges from the confining means.

A polymerization initiator to be used for the present invention may be selected properly in accordance with the polymerization mode, which may be photo or UV polymerization, or redox or thermal initiated polymerization. The residence time of the monomer mixture in the tube until continuous strand is emitted may be about 1 minute. Owing to the performance and the easiness of polymerization control, the polymerization method is preferably carried out by activating the polymerization while the monomer mixture is in the confining means.

In addition, in the continuous polymerization, polymerization at a high temperature starting (monomer at 30° C. or higher, 35° C. or higher, or 40° C. or higher, or 50° C. or higher: the upper limit is the boiling point) or a high monomer concentration (30 weight % or higher, 35 weight % or higher, 40 weight % or higher, and 45 weight % or higher: the upper limit is the saturated concentration) can be exemplified as one preferable example.

A polymerization initiator to be used for the present invention can be selected properly in accordance with the polymerization mode. Examples of the polymerization initiator may include radical polymerization initiator such as a photo decomposition type polymerization initiator, a photosensitizer type initiator, a heat decomposition type polymerization initiator, and a redox type polymerization initiator. The amount of the polymerization initiator may be 0.0001% to 1% by mole, or from 0.001% to 0.5% by mole to the monomer.

Examples of the photodecomposition type polymerization initiator may include benzoin derivatives, benzyl derivatives, acetophenone derivatives, benzophenone derivatives, and azo compounds. Acetophenones, benzophenones, and anthraquinones can also act as photosensitizers, to continually initiate radical generation without decomposing. Examples of the heat decomposition type polymerization initiator may include persulfuric acid salts (sodium persulfate, potassium persulfate, and ammonium persulfate), peroxides (hydrogen peroxide, tert-butyl peroxide, methyl ethyl ketone peroxide), azo compounds (2,2'-azobis(2-amindinopropane)dihydrochloride, 2,2'-azobis[2-(2-imidazolin-2-yl) propane]dihydrochloride, etc.).

Further, combination use of a photodecomposition type initiator and a heat decomposition type polymerization initiator can also be exemplified as a preferable embodiment.

Emission of Polymer

The process to make continuous strand superabsorbent polymer of the present invention includes another step, d) emitting a continuous strand superabsorbent polymer from the confining means wherein the continuous strand superabsorbent polymer has a defined cross-sectional profile comprising a cross sectional diameter of from 0.1 mm to 100 mm. The continuous strand of superabsorbent polymer was emitted from the elastic tube, or a long narrow channel or depression a belt, wherein the continuous strand polymer has an initial cross sectional diameter of the same diameter as the cross-sectional diameter of the confining means, from 0.1 mm to 100 mm immediately prior to exiting the confining means.

Examples of confining means may include a tube, a textured belt, or a moving textured belt. As set above, the belt may be textured in such a way as to generate strands while the monomer is confined in continuous grooves. The belt may include from 1 to 1,000,000 strands per belt, or from 1 to 1000 strands per belt, or from 1 to 500 strands per belt or from 1 to 50 strands per belt.

Generally, the time from the monomer mixture entering the confining means to emission of the continuous strand superabsorbent polymer may be less than 10 minutes, or from 0.1 minutes to 10 minutes, or from 0.1 minutes to 5 minutes or from 0.5 minutes to 2 minutes. Post irradiation of the continuous strand superabsorbent polymer may be conducted by use of UV or thermal radiation to further polymerization, reduce residual monomer, effect property changes and the like.

Cutting

The continuous strand superabsorbent polymer hydrogel obtained by polymerization (hereinafter, sometimes referred to as "hydrogel") may be left as a continuous strand or it may be cut into pieces (e.g., with an average particle length of 0.1 mm to 100 mm, or from 0.5 mm to 3 mm) after emission of the continuous strand superabsorbent polymer hydrogel with a cutter (knife, rotating cutter, or the like) if necessary. The continuous strand superabsorbent polymer may be cut to form superabsorbent polymer particles having a size from the about 150 μm to about 850 μm, or from 300 μm to 600 μm after drying to less than 20 wt % water content. In another embodiment, the continuous strand superabsorbent polymer may be cut to have a PSD having a dried particle diameter of smaller than 600 μm and larger than 150 μm in an amount of not less than about 85 wt % of the particulate superabsorbent polymer composition and as specified by standard EDANA sieve classification method NWSP 230.0.R2 (15). It is preferred that the diameter of the strand is retained in the diameter of the particle in at least one axis, or more preferred, in at least two axes, taking into account any shrinkage that occurs during drying of the hydrogel polymer.

From the physical property aspect, regarding the temperature of the hydrogel at the time of strand cutting, the hydrogel is kept or heated preferably at from 40° C. to 95° C. or from 50° C. to 80° C. The resin solid content of the hydrogel is not particularly limited; however, from the physical property aspect, it is from 10 weight % to 70 weight %, or from 15 weight % to 65 weight %, or from 30 weight % to 55 weight %.

Drying

The drying step of the continuous strand superabsorbent polymer, or particulate of the continuous strand superabsorbent polymer, is carried out after polymerization. The time until the start of drying after strand cutting step is more preferable as it is shorter. That is, after being discharged out of the polymerization apparatus, the crosslinked polymer hydrogel starts to be dried within 1 hour, or within 0.5 hours, or within 0.1 hours (charged to a drier). In order to set the time within the range, drying is preferably carried out directly without carrying out a storage step for the polymer hydrogel. Further, to decrease the residual monomer and accomplish low coloring, the temperature of the hydrogel from completion of the polymerization to starting of the drying is controlled at temperatures of from 40° C. to 95° C., or from 50° C. to 80° C. To facilitate handling of the continuous strand superabsorbent polymer in the drying step, a plasticizer may be added to the monomer mixture.

The drying step provides a dried product having a resin solid content, which is calculated from a drying loss of the polymer (drying of 1 g powder or particles at 180° C. for 3 hours) in an amount controlled to be preferably 80 weight % or higher, or more then 85 weight %, to 99 weight %, or from 90 weight %, to 98 weight %, or from 92 weight %, to 97 weight %. The drying temperature is not particularly limited; however, it is from about 100° C. to about 300° C., or from about 150° C. to about 250° C. To satisfy both of the high physical properties and whiteness, the drying temperature may be from about 150° C. to about 235° C., or from about 165° C. to about 230° C. Further, the drying time is generally less than 60 minutes. If the temperature or the time is out of the above-mentioned range, it may possibly result in decrease of the retention (CRC), increase of soluble matter (extractables), and decrease the whiteness of the product.

Various drying methods such as heat drying, hot-air drying, vacuum drying, infrared drying, microwave drying; drying by a drum drier, azeotropic dehydration with a hydrophobic organic solvent, high humidity drying using high temperature steam can be employed. It is preferably hot-air drying with a gas with a dew point of from 40° C. to 100° C., or from 50° C. to 90° C.

The polymerization forms a superabsorbent polymer gel, which may be cut or granulated into hydrogel pieces, eventually forming superabsorbent polymer particles, or particulate superabsorbent polymer. The polymerization forms a superabsorbent polymer hydrogel, which generally has a water content of about 40 to 70 wt %. The superabsorbent polymer hydrogel is may be cut or granulated, followed by drying, or dried then followed by cutting or granulating into superabsorbent polymer particles or particulate superabsorbent polymer.

The particulate superabsorbent polymer generally includes particle sizes ranging from about 150 μm to about 850 μm. The present invention may include at least about 40 wt % of the particles having a particle size from about 300 μm to about 600 μm, or at least about 50 wt % of the particles having a particle size from about 300 μm to about 600 μm, or at least about 60 wt % of the particles having a particle size from about 300 μm to about 600 μm as measured by screening through a U.S. standard 30 mesh screen and retained on a U.S. standard 50 mesh screen. In addition, the size distribution of the superabsorbent polymer particles of the present invention may include less than about 30% by weight of particles having a size greater than about 600 μm, and less than about 30% by weight of particles having a size of less than about 300 μm as measured according to the standard EDANA test method NWSP 220.0.R2 (15).

After Drying Cross-Sectional Diameter

When the continuous strand superabsorbent polymer, or particulate superabsorbent polymer made from the continuous strand superabsorbent polymer, is dried, the cross-sectional diameter decreases by up to 60%, or from 5% to 50%, or from 10% to 45%, or from 20% to 45% of the initial cross-sectional size of the continuous strand superabsorbent polymer.

Surface Crosslinking and Treatment

The particulate superabsorbent polymers may be surface treated with additional chemicals and treatments as set forth herein. In particular, the surface of the particulate superabsorbent polymer may be additionally crosslinked, generally referred to as surface crosslinking, by the addition of a surface crosslinking agent and heat-treatment. In general, surface crosslinking is a process to increase the crosslink density of the polymer matrix in the vicinity of the particulate superabsorbent polymer surface with respect to the crosslinking density of the particle interior. The amount of the surface crosslinking agent may be present in an amount of from about 0.01 wt % to about 5 wt % of the dry particulate superabsorbent polymer, or such as from about 0.1 wt % to about 3 wt %, or such as from about 0.1 wt % to about 1 wt % by weight, based on the weight of the dry superabsorbent polymer.

Desirable surface crosslinking agents include chemicals with one or more functional groups that are reactive toward pendant groups of the polymer chains, typically the acid groups. Surface crosslinking agents comprise functional groups which react with functional groups of a polymer structure in a condensation reaction (condensation crosslinker), in an addition reaction or in a ring opening reaction.

These compounds may include, for example, polyols including di- or polyfunctional alcohols, carbonates, amines and polyfunctional amines, β-hydroxyalkylamides, polyfunctional amido amines, oxazolidinones, epoxides and polyfunctional epoxides, diglycidyl ethers, and the like, and alkoxylated derivatives, thereof, including propane diol, butane diol, ethylene glycol diglycidyl ether, diethylene glycol, triethylene glycol, polyethylene glycol, glycerine, polyglycerine, propylene glycol, diethanolamine, triethanolamine, polyoxypropylene, oxyethylene-oxypropylene block copolymers, sorbitan fatty acid esters, polyoxyethylene sorbitan fatty acid esters, trimethylolpropane, pentaerythritol, polyvinyl alcohol, sorbitol, 2-hydroxyethyloxazolidin-2-one, oxazolidin-2-one, 1,3-propanediol. 1,3-dioxolan-2-one (ethylene carbonate), 4-methyl-1,3-dioxolan-2-one (propylene carbonate), or 4,5-dimethyl-1,3-dioxolan-2-one and alkoxylated derivatives, thereof.

After the particulate superabsorbent polymer has been brought into contact with the surface crosslinking agent, or with the fluid comprising the surface crosslinking agent, the treated particulate superabsorbent polymer is heat treated to a temperature of from about 50 to about 300° C., or from about 75° C. to about 275° C., or from about 150° C. to about 250° C., and for a time of from about 5 minutes to about 90 minutes dependent on the temperature, so that the outer region of the particulate superabsorbent polymer is more strongly crosslinked compared to the inner region (i.e., surface crosslinking). The duration of the heat treatment is limited by the risk that the desired property profile of the polymer structures will be destroyed as a result of the effect of heat.

In one particular aspect of surface crosslinking, the particulate superabsorbent polymer is surface-treated with ethylene carbonate followed by heating to affect surface crosslinking of the superabsorbent polymer particle, which improves the surface crosslinking density and the gel strength characteristics of the particulate superabsorbent polymer. More specifically, the surface crosslinking agent is coated onto the particulate superabsorbent polymer by mixing the particulate superabsorbent polymer with an aqueous alcoholic solution of the ethylene carbonate surface crosslinking agent. The amount of alcohol in the aqueous alcoholic solution may be determined by the solubility of the alkylene carbonate and is kept as low as possible for various reasons, for instance, for protection against explosions. Suitable alcohols are methanol, isopropanol, ethanol, butanol, or butyl glycol, as well as mixtures of these alcohols. In some aspects, the solvent desirably is water, which typically is used in an amount of about 0.3 wt % to about 5.0 wt %, based on the weight of the dry particulate superabsorbent polymer composition. In still other aspects, the ethylene carbonate surface crosslinking agent may be applied from a powder mixture, for example, with an inorganic carrier material, such as silicone dioxide ($SiO_2$), or in a vapor state by sublimation of the ethylene carbonate.

To achieve the desired surface crosslinking properties, the surface crosslinking agents such as ethylene carbonate should be distributed evenly on the particulate superabsorbent polymer. For this purpose, mixing is effected in suitable mixers known in the art, such as fluidized bed mixers, paddle mixers, rotary drum mixers, or twin-worm mixers. It is also possible to carry out the coating of the particulate superabsorbent polymer during one of the process steps in the production of the particulate superabsorbent polymer. The heat treatment, which follows the coating treatment of the particulate superabsorbent polymer, may be carried out as follows. In general, the heat treatment is at a temperature of from about 100° C. to about 300° C. Lower temperatures are possible if highly reactive epoxide crosslinking agents are used. However, if an ethylene carbonate is used, then the thermal treatment is suitably at a temperature of from about 150° C. to about 250° C. In this particular aspect, the treatment temperature depends on the dwell time and the kind of ethylene carbonate. For example, at a temperature of about 150° C., the thermal treatment is carried out for one hour or longer. In contrast, at a temperature of about 250° C., a few minutes (e.g., from about 0.5 minutes to about 5 minutes) are sufficient to achieve the desired surface crosslinking properties. The thermal treatment may be carried out in conventional dryers or ovens known in the art. Surface crosslinking may also be carried out on the uncut strand if so desired.

In addition to surface crosslinking, the superabsorbent polymer may be further surface treated with other chemical compositions, with or after the surface crosslinking step. The strand or particulate superabsorbent polymer according to the invention may be treated with from about 0.001% to about 10% by weight, or from 0.01% to about 7.5% by weight, or from 0.1% to about 5% by weight, of a salt or salts, in each case based on the superabsorbent weight of a salt or salts, in each case, wherein the salt comprises a divalent or higher-valent cation of a metal, and at least one organic base as an anion.

The divalent or higher-valent cation of a metal may be selected from the group consisting of $Mg^{2+}$, $Ca^{2+}$, $Ba^{2+}$, $Al^{3+}$, $Fe^{2+}$, $Fe^{3+}$, $Ga^{3+}$, $Ti^{4+}$, $Zr^{4+}$, $Cu^{2+}$, and $Zn^{2+}$. The organic base may be an at least partially deprotonated mono-, di- or tri-carboxylic acid, or to deprotonated mono-carboxylic acids. Also included may be hydroxycarboxylic acids, such as at least partially deprotonated mono-, di- or hydroxy-tri-carboxylic acids, and monohydroxycarboxylic acids.

Anions may include the corresponding bases of the following acids: anisic acid, benzoic acid, formic acid, valeric acid, citric acid, glyoxylic acid, glycolic acid, glycerolphosphoric acid, glutaric acid, chloracetic acid, chloropropionic acid, cinnamic acid, succinic acid, acetic acid, tartaric acid, lactic acid, pyruvic acid, fumaric acid, propionic acid, 3-hydroxypropionic acid, malonic acid, maleic acid, butyric acid, isobutyric acid, imidinoacetic acid, malic acid, isothionic acid, methylmaleic acid, adipic acid, itaconic acid, crotonic acid, oxalic acid, salicylic acid, gluconic acid, gallic acid, sorbic acid, gluconic acid, fatty acids, such as stearic acid and adipic acid, and p-hydroxybenzoic acid, including tartrate and lactate.

In another embodiment of the process of the invention, the salt used may be a salt that comprises aluminum lactate. At least about 50% by weight, or at least about 75% by weight, or 100% by weight, of that salt are based on aluminum lactate. In addition to the aluminum lactate, it may be for one or two or more further cations to be present. Such a cation may be selected from monovalent, divalent or higher-valent cations of a metal selected in turn from the group consisting of $Mg^{2+}$, $Ca^{2+}$, $Ba^{2+}$, $Al^{3+}$, $Fe^{2+}$, $Fe^{3+}$, $Ga^{3+}$, $Ti^{4+}$, $Zr^{4+}$, $Cu^{2+}$ and $Zn^{2+}$. Moreover, in addition to the aluminum lactate, it is also possible for further anions to be present in the salt. Furthermore, in addition to aluminum lactate, it is also possible for oxides or mixed oxides of further metals to be present, such as being given to the oxides of the metal ions mentioned in this section. For example, in connection with the solution containing the salt, the solution may contain a secondary salt an alkali metal or alkaline earth metal salt, or an alkali metal salt of one of the above-mentioned anions, or the anion of the main salt chiefly present in the solution. These include lithium lactate and sodium lactate. The amount of the secondary salt may be from 0.001% to about 25% by weight, or from 0.01% to about 17% by weight, or from about 0.1% to about 12% by weight, in each case based on the main salt.

In another embodiment of the present invention, an anion different from the organic base may be used. The anion may be an inorganic base. That inorganic base may be a deprotonated inorganic acid. Such acids are able to release two or more protons. They include acids containing sulfur, nitrogen, or phosphorus, such as acids containing sulfur or phosphorus. Acids containing sulfur, especially sulfuric acid and accordingly sulfate as the salt thereof, may be used for the base. In accordance with another embodiment of the process of the invention, in process step ii) there may be used as further salt a salt comprising aluminum sulfate. At least about 50% by weight, or at least about 75% by weight, or 100% by weight, of that salt may be based on aluminum sulfate. The two different anions may be used in a ratio of from about 1:100 to about 100:1, or in a ratio of from about 1:10 to about 10:1, or from about 1:5 to about 5:1.

The salt may be brought into contact with the untreated, superabsorbent polymer by mixing together the two components, suitable mixing apparatus for the purpose being such as a Patterson Kelley mixer, DRAIS turbulent mixer, Lödige mixer, Ruberg mixer, screw mixer, plate mixer, and fluidized bed mixer or continuously operating vertical or horizontal mixers in which the polymer structure is mixed at high frequency by means of rotating blades (Schugi mixer).

Furthermore, the salt may be brought into contact with the untreated, superabsorbent polymer in the form of a fluid, comprising a solvent and the salt dissolved or dispersed in that solvent, or in dry form as a salt powder. Suitable solvents, in addition to water, may be water-miscible, organic solvents such as, for example, methanol, ethanol, 1-propanol, 2-propanol, 1,2-propanediol, 1,3-propanediol, 1-butanol, 2-butanol, tert-butanol, isobutanol, or mixtures of organic solvents or mixtures of water with one or more of those organic solvents, such as being given to water as solvent. If the untreated, superabsorbent polymer is brought into contact with the fluid comprising the solvent and the salt, such that the fluid Fi may contain the salt in an amount in a range of from about 0.1% to about 50% by weight, or from about 1% to about 40% by weight, or from about 5% to about 25% by weight, in each case based on the total weight of the fluid.

The superabsorbent polymer composition may include from about 0 wt % to about 5 wt %, or from about 0.001 wt % to about 3 wt %, or from about 0.01 wt % to about 2 wt % based on the weight of the dry superabsorbent polymer composition of water-insoluble, inorganic powder. Examples of insoluble, inorganic powders include silicon dioxide, silica, titanium dioxide, aluminum oxide, magnesium oxide, zinc oxide, talc, calcium phosphate, clays, diatomaceous earth, zeolites, bentonite, kaolin, hydrotalcite, activated clays, etc. The insoluble inorganic powder additive may be a single compound or a mixture of compounds selected from the above list. Examples of silica include fumed silica, precipitated silica, silicon dioxide, silicic acid, and silicates. In some particular aspects, microscopic non-crystalline silicon dioxide is desirable. Products include SIPERNAT® 22S specialty silica and AEROSIL® 200 fumed silica available from Evonik Corporation, Parsippany, New Jersey. In some aspects, the particle diameter of the inorganic powder can be 1,000 μm or smaller, such as 100 μm or smaller.

The superabsorbent polymer may also include from 0 wt % to about 30 wt %, or from about 0.001 wt % to about 25 wt %, or from about 0.01 wt % to about 20 wt % based on the weight of the dry particulate superabsorbent polymer composition, of water-soluble polymers, such as partly or completely hydrolyzed polyvinyl acetate, polyvinylpyrrolidone, starch or starch derivatives, polyglycols or polyacrylic acids, preferably in polymerized-in form. The molecular weight of these polymers is not critical as long as they are water-soluble. Preferred water-soluble polymers are starch and polyvinyl alcohol. The content of such water-soluble polymers in the superabsorbent polymer according to the invention may be from 0 wt % to 30 wt %, or 0 wt % to 5 wt %, based on the total amount of the dry superabsorbent polymer composition. The water-soluble polymers, or synthetic polymers, such as polyvinyl alcohol, can also serve as a graft base for the monomers to be polymerized.

The superabsorbent polymer may also include from 0 wt % to about 5 wt %, or from about 0.001 wt % to about 3 wt %, or from about 0.01 wt % to about 2 wt % based on the weight of the dry superabsorbent polymer composition, of dedusting agents, such as hydrophilic and hydrophobic dedusting agents such as those described in U.S. Pat. Nos. 6,090,875 and 5,994,440.

In some aspects, additional surface additives may optionally be employed with the superabsorbent polymer composition, such as odor-binding substances, such as cyclodextrins, zeolites, inorganic or organic salts, and similar materials; anti-caking additives, flow modification agents, surfactants, viscosity modifiers, urine stability promoters and the like.

In other embodiments, the superabsorbent polymer may include 0.0001 wt % to 5 wt % additives that enhance whiteness of the polymer or the long-term color stability such as against darkening, yellowing or browning. Such additives are well known in the art and include anti-oxidants, sulfur- and phosphorous-containing compounds, chelating agents, optical brighteners and the like. Preferred additives for color stability are 2-hydroxy-2-sulfonato acetic acid, bisulfites, phosponates, ethylenediaminetetraaceticacid, ethylenediamine-N,N'-disuccinic acid, diethylenediaminepentaacetic acid, their salts and derivatives, and mixtures thereof.

The superabsorbent polymer of the present invention may be, after the heat treatment step, treated with an aqueous solution, such as the aqueous solution of deprotonated organic acid salt, aluminum salt, or water soluble polymer such as polyethylene glycol.

The superabsorbent polymer of the present invention exhibits certain characteristics, or properties, as measured by the CRC.

All values of the CRC, set forth herein are to be understood as being determined by the CRC Test as provided herein.

The particulate superabsorbent polymer composition made by a process of the present invention may have a centrifuge retention capacity of from about 25 g/g to about 50 g/g, or from about 27 to about 45 g/g.

When the state of the polymer is a particulate superabsorbent polymer, the particulate superabsorbent polymer generally has a particle size of at least about 40 wt % of the particles having a particle size from about 300 μm to about 600 μm, or at least about 50 wt % of the particles having a particle size from about 300 μm to about 600 μm, or at least about 60 wt % of the particles having a particle size from about 300 μm to about 600 μm as measured by screening through a U.S. standard 30 mesh screen and retained on a U.S. standard 50 mesh screen.

The particulate superabsorbent polymer composition made by a process of the present invention may have an Absorbency Under Load at 0.9 psi (AUL(0.9)) of from about 5 g/g to about 30 g/g, or from about 10 g/g to about 25 g/g or from about 10 g/g to 22 g/g.

The particulate superabsorbent polymer compositions according to the present invention can be employed in many absorbent articles including sanitary towels, diapers, or wound coverings, and they have the property that they rapidly absorb large amounts of menstrual blood, urine, or other body fluids. Since the agents according to the invention retain the absorbed liquids even under pressure and are also capable of distributing further liquid within the construction in the swollen state, they are more desirably employed in higher concentrations, with respect to the hydrophilic fiber material, such as fluff, when compared to conventional current superabsorbent compositions. They are also suitable for use as a homogeneous superabsorber layer without fluff content within the diaper construction, as a result of which particularly thin articles are possible. The polymers are furthermore suitable for use in hygiene articles (e.g., incontinence products) for adults.

The polymers according to the invention are also employed in absorbent articles that are suitable for further uses. In particular, the polymers of this invention can be used in absorbent compositions for absorbents for water or aqueous liquids, preferably in constructions for absorption of body fluids, in foamed and non-foamed sheet-like structures, in packaging materials, in constructions for plant growing, as soil improvement agents or as active compound carriers. For this, they are processed to a web by mixing with paper or fluff or synthetic fibers or by distributing the superabsorbent polymers between substrates of paper, fluff or non-woven textiles or by processing into carrier materials.

Test Procedures
Centrifuge Retention Capacity Test (CRC)

The CRC Test measures the ability of the particulate superabsorbent polymer composition to retain liquid therein after being saturated and subjected to centrifugation under controlled conditions. The resultant retention capacity is stated as grams of liquid retained per gram weight of the sample, (g/g). For particulate superabsorbent polymer, the sample to be tested is prepared from particles that are pre-screened through a U.S. standard 30-mesh screen and retained on a U.S. standard 50-mesh screen. As a result, the particulate superabsorbent polymer composition sample comprises particles sized in the range of about 300 to about 600 microns. The particles can be pre-screened by hand or automatically.

The retention capacity is measured by placing about 0.20 grams of the pre-screened particulate superabsorbent polymer composition sample into a water-permeable bag that will contain the sample while allowing a test solution (0.9 weight percent sodium chloride in distilled water) to be freely absorbed by the sample. A heat-sealable tea bag material, such as that available from Dexter Corporation (having a place of business in Windsor Locks, Connecticut, U.S.A.) as model designation 1234T heat sealable filter paper works well for most applications. The bag is formed by folding a 5-inch by 3-inch sample of the bag material in half and heat-sealing two of the open edges to form a 2.5-inch by 3-inch rectangular pouch. The heat seals are about 0.25 inches inside the edge of the material. After the sample is placed in the pouch, the remaining open edge of the pouch is also heat-sealed. Empty bags are also made to serve as controls. Three samples are prepared for each particulate superabsorbent polymer composition to be tested.

The sealed bags are submerged in a pan containing the test solution at about 23° C., making sure that the bags are held down until they are completely wetted. After wetting, the particulate superabsorbent polymer composition samples remain in the solution for about 30 minutes, at which time they are removed from the solution and temporarily laid on a non-absorbent flat surface.

The wet bags are then placed into the basket wherein the wet bags are separated from each other and are placed at the outer circumferential edge of the basket, wherein the basket is of a suitable centrifuge capable of subjecting the samples to a g-force of about 350. One suitable centrifuge is a CLAY ADAMS DYNAC II, model #0103, having a water collection basket, a digital rpm gauge, and a machined drainage basket adapted to hold and drain the flat bag samples. Where multiple samples are centrifuged, the samples are placed in opposing positions within the centrifuge to balance the basket when spinning. The bags (including the wet, empty bags) are centrifuged at about 1,600 rpm (e.g., to achieve a target g-force of about 350 g force with a variance from about 240 to about 360 g force), for 3 minutes. G force is defined as an unit of inertial force on a body that is subjected to rapid acceleration or gravity, equal to 32 ft/sec$^2$ at sea level. The bags are removed and weighed, with the empty bags (controls) being weighed first, followed by the bags containing the particulate superabsorbent polymer composition samples. The amount of solution retained by the particulate superabsorbent polymer composition sample, taking into account the solution retained by the bag itself, is the centrifuge retention capacity (CRC) of the superabsorbent polymer, expressed as grams of fluid per gram of superabsorbent polymer. More particularly, the retention capacity is determined by the following equation:

CRC=[sample bag after centrifuge−empty bag after centrifuge−dry sample weight]/dry sample weight The three samples are tested, and the results are averaged to determine the CRC of the particulate superabsorbent polymer composition.

Absorbency Under Load Test (AUL(0.9 psi))

The Absorbency Under Load (AUL) Test measures the ability of the particulate SAP to absorb a 0.9 weight percent solution of sodium chloride in distilled water at room temperature (test solution) while the material is under a 0.9 psi load. The apparatus for testing AUL consists of:

An AUL assembly including a cylinder, a 4.4 g piston, and a standard 317 gm weight. The components of this assembly are described in additional detail below.

A flat-bottomed square plastic tray that is sufficiently broad to allow the glass frits to lay on the bottom without contact with the tray walls. A plastic tray that is 9" by 9" (22.9 cm×22.9 cm), with a depth of 0.5 to 1" (1.3 cm to 2.5 cm) is commonly used for this test method.

A 9 cm diameter sintered glass frit with a 'C' porosity (25-50 microns). This frit is prepared in advance through equilibration in saline (0.9% sodium chloride in distilled water, by weight). In addition to being washed with at least two portions of fresh saline, the frit must be immersed in saline for at least 12 hours prior to AUL measurements.

Whatman Grade 1.9 cm diameter filter paper circles.

A supply of saline (0.9% sodium chloride in distilled water, by weight).

The cylinder 412 of the AUL assembly 400 used to contain the particulate superabsorbent polymer composition 410 is made from one-inch (2.54 cm) inside diameter thermoplastic tubing machined-out slightly to be sure of concentricity. After machining, a mesh stainless steel wire cloth is attached to the bottom of the cylinder by heating the steel wire cloth in a flame until red hot, after which the cylinder is held onto the steel wire cloth until cooled. A soldering iron can be utilized to touch up the seal if unsuccessful or if it breaks. Care must be taken to maintain a flat smooth bottom and not distort the inside of the cylinder.

The 4.4 g piston is made from one-inch diameter solid material (e.g., polymethylmethacrylate) and is machined to closely fit without binding in the cylinder.

A standard 317 gm weight is used to provide a 62,053 dyne/cm$^2$ (about 0.9 psi) restraining load. The weight is a cylindrical, 1 inch (2.5 cm) diameter, stainless steel weight that is machined to closely fit without binding in the cylinder.

Unless specified otherwise, a sample corresponding to a layer of at least about 300 gsm. (0.16 g) of SAP particles is utilized for testing the AUL. The sample is taken from SAP particles that are pre-screened through U.S. standard #30 mesh and retained on U.S. std. #50 mesh. The SAP particles can be pre-screened with, for example, a RO-TAP® Mechanical Sieve Shaker Model B available from W. S. Tyler, Inc., Mentor Ohio. Sieving is conducted for about 10 minutes.

The inside of the cylinder is wiped with an antistatic cloth prior to placing the SAP particles into the cylinder.

The desired amount of the sample of sieved particulate SAP (about 0.16 g) is weighed out on a weigh paper and evenly distributed on the wire cloth at the bottom of the cylinder. The weight of the particulate SAP in the bottom of the cylinder is recorded as 'SA,' for use in the AUL calculation described below. Care is taken to be sure no particulate SAP cling to the wall of the cylinder. After carefully placing the 4.4 g piston and 317 g weight on the SAP particles in the cylinder, the AUL assembly 400 including the cylinder, piston, weight, and SAP particles is weighed, and the weight is recorded as weight 'A'.

A sintered glass frit (described above) is placed in the plastic tray, with saline added to a level equal to that of the upper surface of the glass frit. A single circle of filter paper is placed gently on the glass frit, and the AUL assembly 400 with the particulate SAP is then placed on top of the filter paper. The AUL assembly is then allowed to remain on top of the filter paper for a test period of one hour, with attention paid to keeping the saline level in the tray constant. At the end of the one hour test period, the AUL apparatus is then weighed, with this value recorded as weight 'B.'

The AUL(0.9 psi) is calculated as follows:

AUL(0.9 psi)=(B−A)/SA wherein

A=Weight of AUL Unit with dry SAP

B=Weight of AUL Unit with SAP after 60 minutes absorption

SA=Actual SAP weight

A minimum of two tests is performed and the results are averaged to determine the AUL value under 0.9 psi load. The particulate SAP samples are tested at about 23° C. and about 50% relative humidity.

Residual Monoethylenically Unsaturated Monomer Test

The residual monoethylenically unsaturated monomer analysis is carried out using solid film obtained from the polymer solution or superabsorbent composition. By way of example for this test description, the monoethylenically unsaturated monomer is acrylic acid. High performance liquid chromatography (HPLC) with a SPD-10Avp Shimadzu UV detector (available from Shimadzu Scientific Instruments, having a place of business in Columbia, Md., U.S.A) is used to determine the residual acrylic acid monomer content. To determine the residual acrylic acid monomer, about 2.0000+/−0.0010 grams of dry superabsorbent polymer is stirred in a mixture of 88.0 ml of a 0.9% NaCl-solution and 10 ml of 20% aluminum sulfate for 10 minutes using a Ultr-Turrax T25 homogenizer dispersing tool at about 9500 rpm speed. The mixture is filtered with 0.45 micron filter paper and the filtrate is then passed through a Nucleosil C8 120A reverse phase column (available from Column Engineering Incorporated, a business having offices located in Ontario, Calif., U.S.A.) to separate the acrylic acid monomer. The acrylic acid monomer elutes at a certain time with detection limit at about 10 ppm. The peak area of resulting elutes calculated from the chromatogram is then used to calculate the amount of residual acrylic acid monomer in the polymer. Initially, a calibration curve was generated by plotting the response area of pure acrylic acid elutes against its known amount (ppm). A linear curve with a correlation coefficient of greater than 0.996 was obtained.

Percent water of the polymer is measured by the standard EDANA test method NWSP 230.0.R2 (15).

EXAMPLES

The following Comparative Examples 1-3, and Examples 1-18 are provided to illustrate the inventions of processes to make superabsorbent polymer and polymers as set forth in the claims, and do not limit the scope of the claims. Unless otherwise stated all parts, and percentages are based on the dry particulate superabsorbent polymer composition.

Comparative Example 1

A superabsorbent polymer was made in the following way. Into a polyethylene vessel equipped with an agitator and cooling coils was added, 2.0 kg of 50% NaOH and 3.32 kg of distilled water and cooled to 20° C. 0.8 kg of glacial acrylic acid was then added to the caustic solution and the solution again cooled to 20° C. 4.8 g of polyethylene glycol monoallylether acrylate (PEGMAE-Acrylate), 4.8 g of ethoxylated trimethylol propane triacrylate SARTOMER® 454 product (3EOTMPTA), and 1.6 kg of glacial acrylic acid were added to the first solution, followed by cooling to 4-6° C. Nitrogen was bubbled through the monomer solution for about 5 minutes. The monomer solution was then discharged into a rectangular tray. 80 g of 1% by weight of $H_2O$ aqueous solution, 120 g of 2 wt % aqueous sodium persulfate solution, and 72 g of 0.5 wt % aqueous sodium erythorbate solution was added into the monomer solution to initiate polymerization reaction. The agitator was stopped and the initiated monomer was allowed to polymerize for 20 minutes to form a continuous slab.

A particulate superabsorbent polymer may be prepared as follows. The resulting hydrogel was chopped and extruded with a Hobart 4M6 commercial extruder, followed by drying in a Procter & Schwartz Model 062 forced air oven at 175° C. for 12 minutes with up flow and 6 minutes with down flow air on a 20 inch×40 inch perforated metal tray to a final product moisture level of less than 5 wt %. The dried material was coarse-ground in a Prodeva Model 315-S crusher, milled in an MPI 666-F three-stage roller mill and sieved with a Minox MTS 600DS3V to remove particles greater than 850 μm and smaller than 150 μm.

Example 1

A continuous strand superabsorbent polymer was made in the following way. A monomer mixture is made as follows. Into a polyethylene vessel equipped with an agitator, 145 g of 50% NaOH and 268 g of ice. 120 g of glacial acrylic acid was then added to the caustic solution and the solution was stirred. 100 mg of polyethylene glycol monoallylether acrylate, 100 mg of ethoxylated trimethylol propane triacrylate SARTOMER® 9035 (15EOTMPTA) product were blended with 60 g of glacial acrylic acid and added to the first solution. The monomer mixture further includes a UV initiator sodium antraquinone-2-sulfonate. The monomer mixture has a solids content of 30%.

The monomer mixture solution was pumped into a silicone elastomer tube having a dimension of 2.6 mm internal diameter and length of 10 cm, using a Cole Parmer XX pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of 2.6 mm. The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm).

The residence time of the monomer mixture in the tube until continuous strand is emitted was 1 minute. The continuous strand of superabsorbent polymer was emitted from the elastic tube wherein the continuous strand superabsorbent polymer has an initial cross sectional diameter of 2.6 mm.

Examples 2 to 6

A continuous strand superabsorbent polymer and particulate superabsorbent polymer were made in the following way. A monomer mixture was made as follows. Into a polyethylene vessel equipped with a magnetic stir bar, 536 grams of ice; 296 grams of 50% by weight NaOH were poured into the beaker with the ice. The beaker was put onto a magnetic stir plate and the ice and caustic solutions were stirred. 300 grams of glacial acrylic acid were added. The liquid was allowed to stir and blend thoroughly. After the solution was homogenous, a solution of 200 mg of ethoxylated trimethylol propane triacrylate SARTOMER® 9035 15EOTMPTA crosslinker in 60 grams glacial acrylic acid was added. 200 mg sodium persulfate was dissolved in 5 ml deionized water and added to the monomer solution. 200 mg of 24% by weight stannous sulfate aqueous solution was added as a UV coinitiator. 200 mg of Darocur 1173 UV initiator was added and the solution was allowed to stir.

The monomer mixture was pumped at 1 g/min with a Cole-Parmer Masterflex pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of 1.6 mm. The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm).

Polymerization began in the silicone tube to the extent that a shape-defined strand emerged from the tube. Gravity then pulled the strand down to a collection dish as the strand continuously emerged. Once the continuous strand superabsorbent polymer was flowing in a stable fashion, polymerization ran without interruption for 30 hours. The continuous strand superabsorbent polymer was then dried in a convection oven at 175° for 40 minutes and cut into particles. The now particulate superabsorbent polymer (PSX) was then surface-crosslinked by the following procedure: 15 grams of PSX particulate superabsorbent polymer at 35° C. were coated uniformly with 1% ethylene carbonate and 4% water by weight using a 20 wt % aqueous ethylene carbonate solution applied atomized with a mini airbrush with pressurized air. The coated particulate superabsorbent polymer was then placed in a 27 mm diameter×65 mm high stainless steel cup and heated to 185° C. over the course of 30 minutes at a uniform rate of 5° C. per minute while stirring continuously at 10 rpm with a metal paddle stirrer. After the product reached 185° C., it was then held for the various times at 185° C. as found in Table 1 to accomplish the surface crosslinking reaction.

TABLE 1

|  | hold time at 185° C. | CRC, g/g | 0.9 psi AUL, g/g | Residual monomer, ppm |
| --- | --- | --- | --- | --- |
| Ex 2 | PSX (0) | 42.2 | 7.3 | 139 |
| Ex 3 | 30 min | 32.9 | 8.8 | 276 |
| Ex 4 | 40 min | 30.9 | 9.1 | 309 |

TABLE 1-continued

| | hold time at 185° C. | CRC, g/g | 0.9 psi AUL, g/g | Residual monomer, ppm |
|---|---|---|---|---|
| Ex 5 | 50 min | 28.9 | 10.7 | 327 |
| Ex 6 | 60 min | 27.5 | 11.8 | 327 |

PSX = pre-surface crosslinking (before coating and heating)

Examples 7 to 11

A continuous strand superabsorbent polymer and particulate superabsorbent polymer were made in the following way. A monomer mixture solution was prepared by: 268 grams of ice were weighed into a plastic beaker and a magnetic stir bar was added. 145 grams of 50% by weight NaOH were poured into the beaker with the ice. The beaker was put onto a magnetic stir plate and the ice and caustic solutions were stirred. 120 grams of glacial acrylic acid were added. The liquid was allowed to stir and blend thoroughly. After the solution was homogenous, a solution of 100 mg 15EOTMPTA and 100 mg of polyethylene glycol monoallylether acrylate, PEGMAE-Acrylate, crosslinkers in 60 grams glacial acrylic acid were added. 100 mg sodium persulfate (NaPS) was dissolved in 5 ml deionized water and added to the monomer solution. 2 grams of 0.5 weight percent aqueous sodium anthraquinone-2-sulfonate solution were added.

The monomer mixture solution was pumped at 0.7 g/min with the delivery system and ultraviolet set-up with a Cole-Parmer Masterflex pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of 1.56 mm. The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm).

Polymerization began in the silicone tube to the extent that a shape-defined strand emerged from the tube. Gravity then pulled the strand down to a collection dish as the strand continuously emerged. The continuous strand superabsorbent polymer was then dried in a convection oven at 175° for 40 minutes and cut into particles. The now particulate superabsorbent polymer (PSX) was then surface-crosslinked according to the procedure described in Examples 2-6. The coated particulate superabsorbent polymer was again heated from 35° C. to 185° C. over a 30 minute period, followed by holding at 185° C. for various times (Table 2) to accomplish the surface crosslinking reaction. The properties of the particulate superabsorbent polymer appear below in Table 2.

TABLE 2

| | hold time at 185° C., (minutes) | CRC, g/g | 0.9 psi AUL, g/g |
|---|---|---|---|
| Ex 7 | PSX (0) | 46.5 | N/A |
| Ex 8 | 30 | 40.2 | 10.8 |
| Ex 9 | 40 | 37.7 | 15 |
| Ex 10 | 50 | 36.6 | 18.7 |
| Ex 11 | 60 | 35.3 | 21.4 |

Examples 12 to 15: Residual Monomer

Tests of the continuous strand superabsorbent polymer were also conducted with sodium anthraquinone sulfonate UV initiator under varied conditions to examine the effects of ultraviolet exposure, sodium persulfate, and flow rate on residual monomer. The monomer mixture with sodium anthraquinone sulfate described above in Examples 7-11 was used, but without sodium persulfate (NaPS) present for the first three conditions, as noted in Table 3. UV post-treatment in Ex 14 was conducted using a Phoseon Firefly ultraviolet 50 mm×20 mm 8 Watt/cm$^2$ LED array for the post-chamber LED exposure. Ultraviolet (365 nm) from the Firefly was directed towards the continuous strand superabsorbent polymer as it emerged from the bottom of the Rayonet photoreactor. Otherwise, the procedure was similar to that in Examples 7 to 11, except that the samples were not surface crosslinked and were tested for residual monomer after drying at the PSX stage.

In Ex 13, flow rate in the tube was increased 43%, decreasing the exposure time to UV, which increased the residual monomer. Therefore, increased initial ultraviolet exposure favors lower residual monomer.

In Ex14, a separate ultraviolet post-treatment was added at the higher flow rate, which reduced residual monomer.

In Ex 15, NaPS (sodium persulfate) was included in the monomer and residual monomer was significantly reduced.

TABLE 3

| | monomer flow, g/min | post-chamber LED | NaPS, ppm | residual monomer, ppm |
|---|---|---|---|---|
| Ex 12 (reference w/o NaPS) | 0.7 | Off | 0 | 4339 |
| Ex 13 (Ex 12 + higher flow rate) | 1 | Off | 0 | 25581 |
| Ex 14 (Ex 13 + UV post-treatment) | 1 | On | 0 | 14974 |
| Ex 15 (Ex 12 + NaPS) | 0.7 | Off | 300 | 1184 |

Examples 16-20: Preparation of a Series of Polymers from Different Strand Diameters A continuous strand superabsorbent polymer was made in the following way. The monomer mixture solution was prepared by: 268 grams of ice were weighed into a plastic beaker and a magnetic stir bar was added. 145 grams of 50% by weight NaOH were poured into the beaker with the ice. The beaker was put onto a magnetic stir plate and the ice and caustic solutions were stirred. 180 grams of glacial acrylic acid were added. The liquid was allowed to stir and blend thoroughly. 100 mg of ethoxylated trimethylol propane triacrylate SARTOMER® 9035 15EOTMPTA crosslinker was added and the liquid was stirred until homogenous. 100 mg sodium persulfate was dissolved in 5 ml deionized water and added to the monomer solution. 2 grams of 0.5 weight percent aqueous sodium anthraquinone-2-sulfonate solution were added.

The monomer mixture was pumped at 1 g/min with a Cole-Parmer Masterflex pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of as set forth in the following Table 4. The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm).

Polymerization began in the silicone tube to the extent that a shape-defined strand emerged from the tube. It was found that the 3.2 mm and 6.4 mm inner diameter tubes required different strand techniques than the 1.6 mm tube. With the larger diameters, the polymer strand was significantly heavier. Thus, as the strand started to build, the weight pulled the building polymer from the tube intermittently. While these could have been prepared by depositing directly to a surface, a convenient approach for small samples was to point the tube exit upwards so that the strand emerged vertically.

Once the strand was flowing in a stable fashion, polymerization ran without interruption for 30 hours. The strand polymer was then dried in a convection oven at 175° C. for 40 minutes and cut into particles. The properties are found in Table 4.

TABLE 4

| | tubing, Thermo-Fisher catalog number | tubing inner diameter, mm | flow, g/min | Initial diameter, mm | Diameter after drying, mm | CRC, g/g |
|---|---|---|---|---|---|---|
| Ex 16 | 8600-0020 | 1.6 | 2.6 | 1.6 | 0.91 | 51 |
| Ex 17 | 8600-0060 | 6.4 | 3.8 | 6.4 | 4.75 | 42.6 |
| Ex 18 | 8600-0030 | 3.2 | 2.6 | 3.2 | 2.24 | 49.5 |

Example 19: 0.8 mm Diameter Strand

A continuous strand superabsorbent polymer was made in the following way. A monomer mixture is made as follows. Into a polyethylene vessel equipped with an agitator, 172.6 g of 50% NaOH and 154 g of ice. 166.1 g of glacial acrylic acid was then added to the caustic solution, and the solution was stirred. 1.1 g of polyethylene glycol monoallylether acrylate, 1.2 g of ethoxylated trimethylol propane triacrylate SARTOMER® 9035 (15EOTMPTA) product were blended with 50 g of glacial acrylic acid and added to the first solution. After the solution was homogenous, 0.54 grams of sodium persulfate were added and dissolved with stirring. 50 mg of sodium anthraquinone-2-sulfonate was then dissolved in the monomer mixture as a photoinitiator.

The monomer mixture solution was pumped into a silicone elastomer tube having a dimension of 2.6 mm internal diameter and length of 10 cm, using a Cole Parmer Masterflex L/S pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of 0.8 mm (1/32"), part number 2LRG7 from Grainger (www.grainger.com). The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm). At a flow rate of 0.81 g/min, the strand was stable and had an average diameter of 800 µm immediately prior to exiting the tubing and 300 µm after drying.

Example 20: 0.5 mm Diameter Strand

A continuous strand superabsorbent polymer was made in the following way. First, a monomer mixture was made as follows. Into a polyethylene vessel equipped with an agitator, 206.4 g of 50% NaOH and 154 g of ice. 209.2 g of glacial acrylic acid was then added to the caustic solution, and the solution was stirred. 1.2 g of polyethylene glycol monoallylether acrylate, 1.2 g of ethoxylated trimethylol propane triacrylate SARTOMER® 9035 (15EOTMPTA) product were blended with 50 g of glacial acrylic acid and added to the first solution. The monomer mixture further included a UV initiator sodium antraquinone-2-sulfonate, which was delivered by adding 10.0 grams of a 0.5% weight/weight solution. After the solution was homogenously mixed, 0.54 grams of sodium persulfate were added and dissolved with stirring.

The monomer mixture solution was pumped into a silicone elastomer tube having a dimension of 2.6 mm internal diameter and length of 10 cm, using a Cole Parmer Masterflex L/S pump with a part number 06404-13 pump head and Masterflex 77200-60 "high pressure" tubing. A Cole Parmer part number 30703-40 barbed coupling was used to connect the outlet end of the tubing to a 10 cm length of silicone elastomer tubing having an inner diameter of 0.5 mm, part number 14170 from Reighelt Chemietechnik GmbH. The tubing was positioned so that the barbed coupling was right at the top of a Rayonet RPR-200 photoreactor equipped with 16 BLB long wavelength tubes (Green Energy Lighting Corporation catalog number 30374, with a maximum light intensity at about 370 nm). At a flow rate of 0.78 g/min, the strand was stable and had an average diameter of 500 µm immediately prior to exiting the tube and 304 µm after drying.

Notwithstanding that the numerical ranges and parameters setting forth the broad scope of the invention are approximations, the numerical values set forth in the specific examples are reported as precisely as possible. Other than in the operating examples, or where otherwise indicated, all numbers expressing quantities of ingredients, reaction conditions, and so forth used in the specification and claims are to be understood as being modified in all instances by the term "about." Any numerical value, however, inherently contain certain errors necessarily resulting from the standard deviation found in their respective testing measurements.

What is claimed is:

1. A process to make continuous strand polymer, the process comprises:
   a) providing a monomer mixture comprising water, a polymerizable unsaturated acid group containing monomer, a crosslinker and an initiator;
   b) transporting the monomer mixture of step a) into a confining means wherein the monomer mixture is cross-sectionally confined in said confining means; wherein "cross-sectionally confined in said confining means" refers to continuous tube that is capable of confining a monomer in at least one axis direction perpendicular to the monomer flow as the monomer moves through the confining means, causing the monomer to polymerize to polymerize into a continuous strand having a cross-sectional diameter of 0.1 mm to 10 mm;
   c) initiating polymerization of the monomer mixture in one continuous step in the confining means to make a continuous strand polymer;
   d) emitting the continuous strand polymer from the confining means wherein the continuous strand polymer has a defined cross-sectional profile comprising an initial cross sectional diameter of at least 0.1 mm immediately prior to exiting the confining means, and e) cutting the continuous strand polymer into polymer particles;

wherein the diameter of the strand is retained in the diameter of the particle in at least one axis, or in at least two axes, taking into account any shrinkage that occurs during drying of the polymer; and wherein the confining means is an elastic tube, which can be penetrated by electromagnetic radiation with wave length between 300 nm up to 500 nm.

2. The process of claim 1 wherein the monomer mixture comprises from 30 to 60 wt % solids based on the monomer mixture of step c).

3. The process of claim 1 wherein the initiator is a photoinitiator and the polymerization is initiated by electromagnetic radiation with wave length between 300 nm up to 500 nm.

4. The process of claim 1 wherein the monomer mixture has a viscosity of from 5 centipoise to 200,000 centipoise measured at a temperature of 25° C. according to ISTM D2196-05 Method A.

5. The process of claim 1 wherein the transporting of step b) comprises pumping or transporting via a tube or pipe the monomer mixture of step a) into the confining means.

6. The process of claim 1 wherein the confining means comprises a circular cross section.

7. The process of claim 1 wherein the confining means comprises a circular cross section with an inner diameter between 0.1 mm to 10 mm.

8. The process of claim 1 wherein a residence time of the monomer mixture in the confining means is from 1 second to 300 seconds.

9. The process of claim 1 wherein the continuous strand polymer emitted from the confining means is polymerized from 20% to 100% of total polymerization of the continuous strand polymer.

10. A process to make continuous strand superabsorbent polymer, the process comprises:

a) providing a monomer mixture comprising water, a polymerizable unsaturated acid group containing monomer, a crosslinker and an initiator;

b) transporting the monomer mixture of step a) into a confining means wherein the monomer mixture is cross-sectionally confined in said confining means; wherein "cross-sectionally confined in said confining means" refers to continuous tube that is capable of confining a monomer in at least one axis direction perpendicular to the monomer flow as the monomer moves through the confining means, causing the monomer to polymerize to polymerize into a continuous strand having a cross-sectional diameter of 0.1 mm to 10 mm;

c) initiating polymerization of the monomer mixture in one continuous step in the confining means;

d) emitting a continuous strand superabsorbent polymer from the confining means wherein the continuous strand superabsorbent polymer has a defined cross-sectional profile comprising an initial cross sectional diameter of from 0.1 mm to 10 mm immediately prior to exiting said confining means, and e) cutting the continuous strand superabsorbent polymer into superabsorbent polymer particles;

wherein the diameter of the strand is retained in the diameter of the particle in at least one axis, or in at least two axes, taking into account any shrinkage that occurs during drying of the polymer; and wherein the confining means is an elastic tube, which can be penetrated by electromagnetic radiation with wave length between 300 nm up to 500 nm.

11. The process of claim 10 wherein the monomer mixture comprises from 30 to 60 wt % solids based on the monomer mixture of step c) and the monomer mixture comprises acrylic acid.

12. The process of claim 10 wherein the initiator is a photoinitiator and the polymerization is initiated by electromagnetic radiation with wave length between 300 nm and 500 nm.

13. The process of claim 10 wherein the monomer mixture has a viscosity of from 5 centipoise to 200,000 centipoise measured at a temperature of 25° C. according to ISTM D2196-05 Method A.

14. The process of claim 10 wherein the transporting step of b) comprises pumping the monomer mixture of step a) into the confining means.

15. The process of claim 10 wherein the continuous strand superabsorbent polymer emitted from the confining means is polymerized from 20% to 100% of total polymerization of the continuous strand polymer.

16. The process of claim 10 wherein a residence time of the monomer mixture in the confining means is from 1 second to 5 minutes.

17. The process of claim 10 further comprising the step of cutting the continuous strand superabsorbent polymer into superabsorbent polymer particles having a particle size distribution from 150 μm to 850 μm.

* * * * *